March 12, 1940. G. E. PIERCE 2,193,377
HYDRAULIC ACTUATED FRICTIONAL BRAKE SYSTEM
Filed Jan. 5, 1938 3 Sheets-Sheet 1
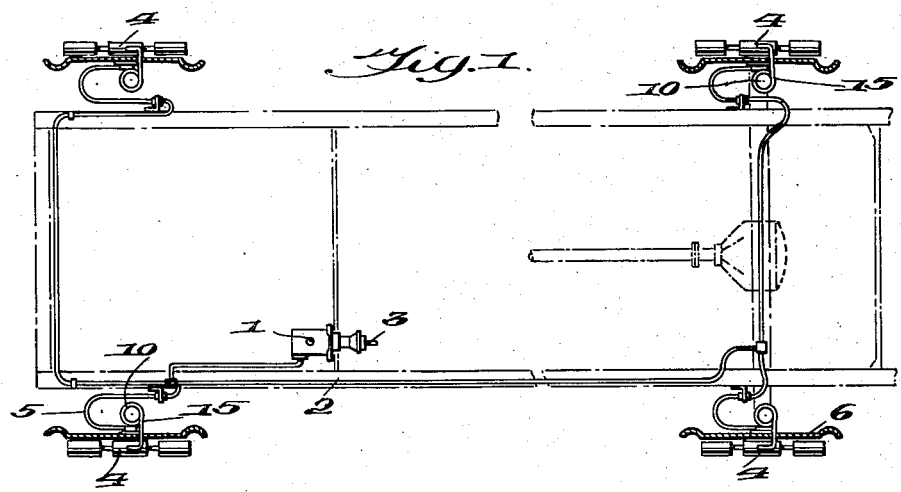
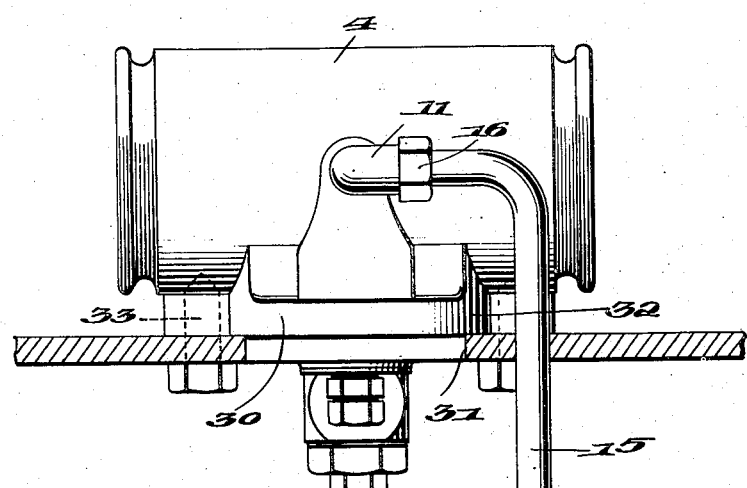
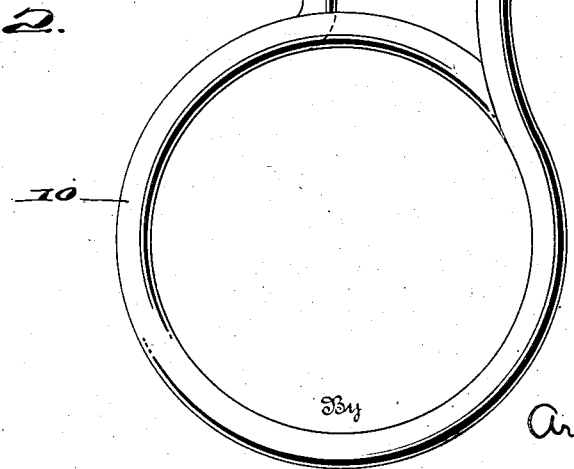
Inventor
GEORGE E. PIERCE
By Arthur H. Robert
Attorney

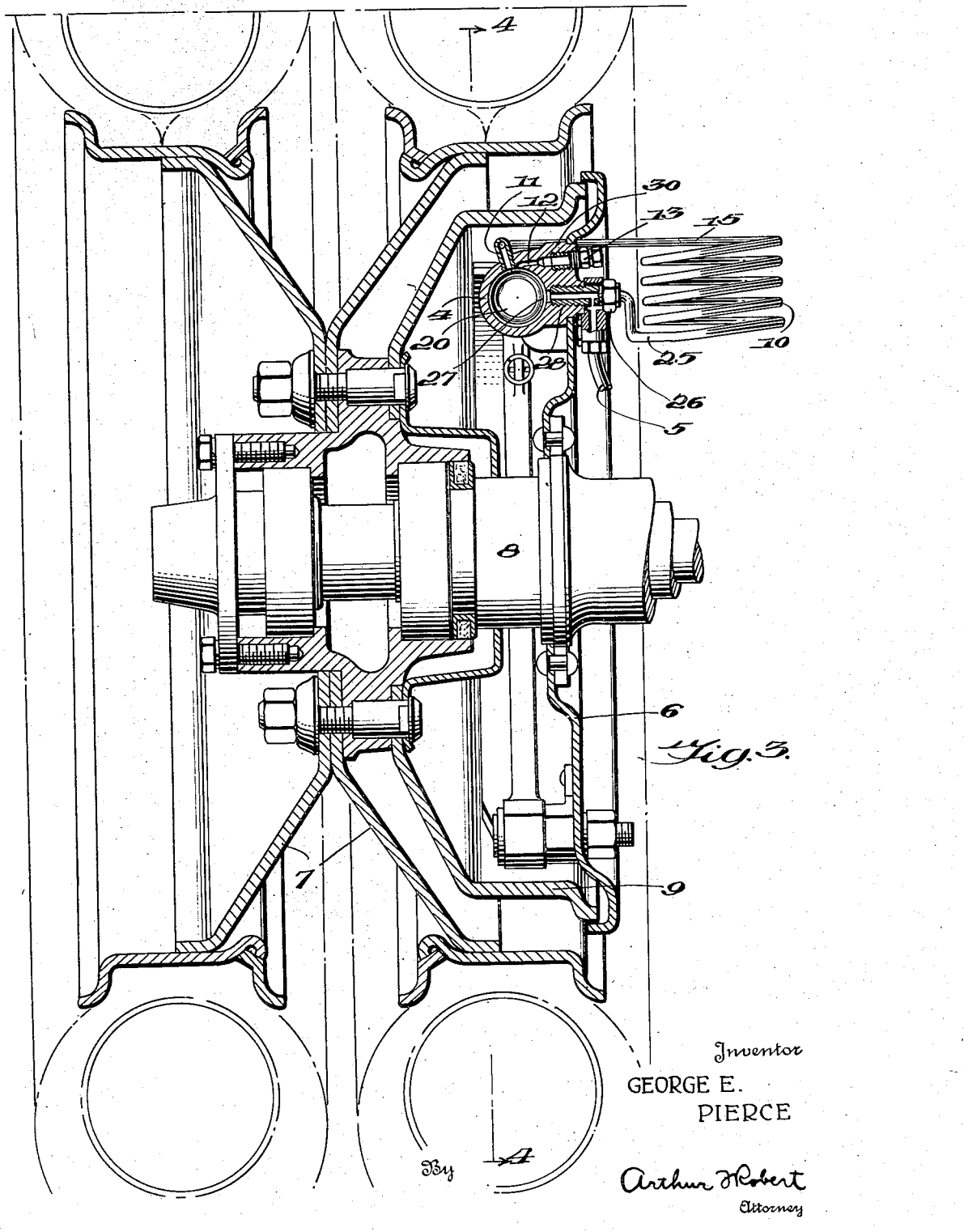

March 12, 1940. G. E. PIERCE 2,193,377
HYDRAULIC ACTUATED FRICTIONAL BRAKE SYSTEM
Filed Jan. 5, 1938 3 Sheets-Sheet 3

Inventor
GEORGE E. PIERCE

By Arthur H Robert
Attorney

Patented Mar. 12, 1940

2,193,377

UNITED STATES PATENT OFFICE 2,193,377

HYDRAULIC ACTUATED FRICTIONAL BRAKE SYSTEM

George E. Pierce, Anchorage, Ky., assignor to himself and Arthur F. Robert, Louisville, Ky.

Application January 5, 1938, Serial No. 183,406

8 Claims. (Cl. 188—152)

This invention relates to hydraulic actuated frictional brakes for motor vehicles.

Although applicable to any and all motor vehicles equipped with hydraulic actuated frictional brakes, the invention is especially intended for and useful upon motor buses, motor trucks and other (passenger or commercial) motor vehicles provided with hydraulic actuated frictional brake systems which may be operated frequently or for long periods.

Such hydraulic actuated frictional brake systems commonly comprise a hydraulic actuating mechanism and a frictional braking mechanism. These mechanisms normally include a master cylinder and several operating cylinders, one mounted within the braking chamber of each wheel in operative relation to the frictional brake mechanism therefor. The hydraulic system is normally maintained full of braking fluid through a connection between the master cylinder and a relatively elevated braking fluid reservoir, which connection, when the master cylinder is in its normal inoperative position, is either open or openable upon the application of a slight fluid pressure exerted in either direction. Upon depression of the brake pedal, the fluid reservoir connection is closed and the fluid within the hydraulic system forced from the master cylinder into all of the operating cylinders, the fluid pressure thus applied actuating the frictional brake mechanism.

For some years past, considerable difficulty has been experienced during the hot weather with hydraulic actuated frictional brake systems, particularly with those on the heavier trucks and passenger buses. These systems, in many instances, have become suddenly inoperative for no apparent reason. Experiences are numerous wherein the vehicle operator applied the brakes successfully at one stop only to find the application ineffective at the next. Furthermore, after a brake failure the brakes often became operative again for no apparent reason. Brake failures of this character always arose after the vehicle had been operated for some time and always occurred with greater frequency in so called hot weather. After considerable investigation and speculation by myself and others, I have found that braking failures of this character are occasioned by the heat generated within the braking chamber; that, on occasions, the heat produced temperature conditions within the braking chamber sufficient to heat the braking fluid in the operating cylinder beyond its normal vaporization point; that although the braking fluid possibly did not vaporize while the brakes were applied, it was free to vaporize the moment the brakes were released because the brake operating system then became "open" through the connection existing between the master cylinder and the reservoir; that upon vaporization the braking fluid was forced from the operating system into the reservoir, thereby temporarily causing a partial or complete failure of the brake operating system; and that the resulting defective brake condition would remain until the operating system was again completely filled with braking fluid.

In attempts to eliminate brake failures of this character, it has been proposed to expose the operating cylinders to outside atmosphere so as to cool the braking fluid therein, and also to expose the feed lines to outside atmosphere so as to precool the braking fluid before it enters the operating cylinders. Neither of these attempts has proved effective.

I have found that such brake failures can be entirely eliminated by connecting an operating cylinder serially within a closed heat-diffusion circuit wherein an endless circulation of braking fluid may be established to remove hot fluid from the cylinder, diffuse or dissipate the heat thereof and return relatively cool fluid to the cylinder. The provision of an arrangement of this character forms the principal object of this invention.

Another important object is to provide, for each operating cylinder, a closed heat-diffusion circuit in which the fluid is free to circulate at all times, that is to say, both during and between brake applications.

While the invention is capable of embodiment in a variety of forms, one of the simpler arrangements, by which it may be easily, inexpensively and effectively carried out, comprises an air-exposed radiator or condenser serially connected to an operating cylinder to form an endless confined gravity system for the flow of braking fluid, which system operates independently of the brake-actuating mechanism. With a gravity system of this character, circulation is automatically set up when the fluid in the operating cylinder becomes heated and is automatically maintained until the temperatude of the fluid in the system is equalized.

An embodiment of the invention is illustrated in the accompanying drawings wherein:

Figure 1 is a diagrammatic plan view of a hydraulic brake system for an automobile, with my invention applied thereto;

Fig. 2 is an enlarged plan view of the invention shown, for example, at the upper right hand part of Fig. 1;

Fig. 3 is a partial central vertical sectional view of a conventional form of automobile bus wheel with my invention applied thereto.

Figure 4:
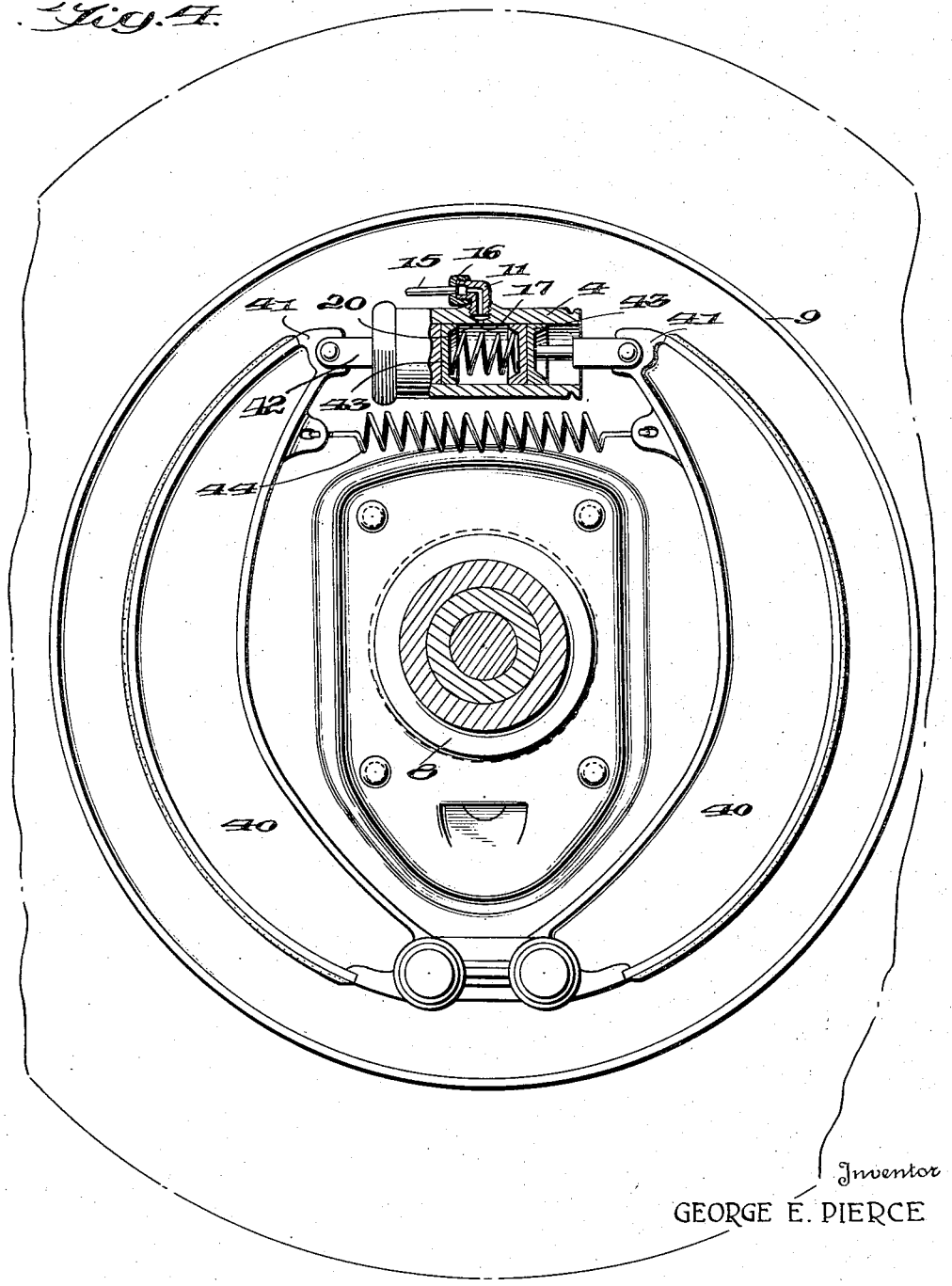
Fig. 4 is a fragmentary side elevational view toward the right from line 4—4 of Fig. 3, partly broken away and showing the hydraulic brake mechanism for the wheel illustrated in Fig. 3 and the manner of application of my invention thereto.

The conventional hydraulic actuated frictional brake system to which my invention is applied in the illustrative specific embodiment disclosed in the drawings comprises a hydraulic operating system and a frictional brake mechanism operated thereby. The system includes the usual master cylinder 1 and individual operating cylinders 4 associated with the respective wheels and communicating with the master cylinder 1 through suitable pipes 5. The master cylinder 1 may be supported in any suitable manner and position upon the chassis frame 2 of the automobile and is provided with a conventional piston, the piston rod 3 of which is operatively connected with the brake pedal (not shown).

The operating cylinders 4, as shown, are conventionally located within the braking chamber, formed by the backing plate 6 and brake drum 9, and mounted upon the backing plate 6 or other non-rotatable part of the wheel assembly. The relation of the individual operating cylinders to the respective wheels and their frictional brake mechanisms is indicated in Fig. 3, which shows my invention associated with a conventional dual wheel mounted upon a hub 8, a brake drum 9 fixed to the wheel adjacent the backing plate 6, expanding articulated brake shoes 40 pivotally mounted within the drum 9 with their free ends 41 pivotally connected by rods 42 with the respective opposed pistons 43 of the operating cylinder 4, but normally held in the released position shown in Fig. 4 by a tension spring 44.

The backing plate 6 is fixed to the hub 8. As clearly shown in Figs. 1 and 3, the plate 6 of each wheel has an operating cylinder 4 mounted upon its upper portion in such manner that it is in operative relation to the brake shoes 40 and brake drum 9, permits the effective application of my invention thereto, and preferably enables the entire brake mechanism to be readily and quickly disassembled.

Any suitable and convenient means may be employed for so attaching the cylinder 4 to backing plate 6. In the particular arrangement illustrated the cylinder wall is formed with an extension block 30 which projects through an aperture 31 in backing plate 6 and has a shoulder 32 seated upon the outer side of the plate. The cylinder 4 is removably held to plate 6 by screws 33 passed through plate 6 into the cylinder wall.

In accordance with my invention, each operating cylinder 4 is serially connected with heat-diffusing means to form an endless circulating system whereby hot fluid may be removed from, and relatively cool fluid simultaneously fed to, the operating cylinder. In the preferred arrangement, the cylinders 4 and adjacent heat diffusers or coolers, form confined gravity systems for the endless flow of braking fluid from the cylinder to the cooler and back to the cylinder. Accordingly, each cylinder 4 is provided with suitable apertures in its wall and proper connections for permitting circulation of the contents of piston chamber 20 through the cooling means and back to the cylinder. The cooling circulation may be effected in or through chambers or pipes variously located and arranged and of many different forms and configurations.

In the form of embodiment illustrated the cooling means comprises a pipe coil 10 having its turns spaced apart and its opposite ends extended and connected by suitable fittings to the interior of the cylinder 4. The upper end 15 of coil 10 is preferably secured, by a connection 16, to a screw fitting 11 removably seated in an aperture 17 in the middle portion of the top wall of the cylinder adjacent the usual bleeder aperture 12 normally closed by plug 13.

The lower end 25 of coil 10 is connected, through a coupling 26, with a screw-threaded fitting 28 having passages communicating with the piston chamber 20 and pipe 5 and removably inserted in a socket in the side wall of cylinder 4 opening into piston chamber 20 through aperture 27.

The invention is not limited to the use of a coil or to a pipe of any particular bore or length. As an illustrative example of a specific embodiment which has been found satisfactory a radiator or cooling coil formed of $\tfrac{3}{16}$" copper tubing 48" long has been used with $\tfrac{1}{8}$" fittings connecting the coil with the cylinder.

In the operation of the invention when the brake pedal connected with the piston rod 3 of master cylinder 1 is depressed, the liquid in the system is placed under pressure, which, being communicated to the liquid in the piston chambers 20 of the several operating cylinders 4, moves the pistons 43 and actuates the brake shoes 40.

Should the brakes be applied for a sufficient length of time or with sufficient frequency to cause the heating of the oil in the piston chamber 20 of cylinder 4 by the heat generated between the friction elements and the brake drum, with or without the aid of atmospheric heat, the heated oil rises in the piston chamber 20 and into the top of coil 10, where it is cooled by the surrounding cooler air or air currents; the cooled oil moves into the lower part of the coil 10 as oil from the bottom of the coil passes into piston chamber 20 to take the place of the heated oil which escaped through aperture 17. The gravity circulation thus created results in the constant cooling of the oil in the gravity system or circuit which includes the coil 10 and cylinder 4 and the condensation of any small quantities of oil which may be vaporized in the cylinder and carried into the radiator coil 10 with the heated liquid. Generally, however, vaporization is entirely or practically prevented by the circulation of the oil which normally fills the system, including cylinder 4 and coil 10. Heat generated in the cylinders by application of the brakes is conveyed to and dissipated in the radiator or other cooling means.

I claim:

1. A hydraulic actuated frictional brake system comprising: a frictional brake mechanism; an operating cylinder therefor having a chamber containing a fluid which normally becomes heated during the operation of said brake mechanism; a heat diffuser; and means connecting the diffuser with the chamber of said cylinder to form an endless circulating system through which fluid may be circulated to remove heated fluid from the chamber while feeding relatively cool fluid to the chamber.

2. A hydraulic actuated frictional brake system comprising: a frictional brake mechanism;

an operating cylinder therefor having a chamber containing a fluid which normally becomes heated during the operation of said brake mechanism; a heat diffuser; and means connecting the diffuser with the chamber of said cylinder to form an endless confined gravity system for the flow of said fluid.

3. An improvement in hydraulic-actuated frictional brakes of the type having a frictional-brake mechanism and a hydraulic-actuating mechanism composed of an operating cylinder connected to the frictional-brake mechanism, and means for forcing a braking liquid under pressure into said cylinder to actuate the braking mechanism comprising: a heat diffuser; and means connecting said diffuser to said operating cylinder to form an endless circulating system whereby liquid may circulate to and from said cylinder through said diffuser independently of said forcing means.

4. The combination with a frictional brake mechanism for a wheel of a motor vehicle and a hydraulic brake operating system having a brake actuating cylinder connected to said mechanism and located relatively thereto as to be subject to the brake heat thereof; of heat radiating means exposed to atmosphere; and means serially connecting the radiating means with the operating cylinder to form a circulating system for the flow of liquid endlessly therebetween and independently of the operation of said system.

5. The combination as claimed in claim 4, wherein said heat radiating means is arranged to present heat radiating surfaces exposed to atmosphere in position to be acted upon by the air flow relatively created when the vehicle is set in motion.

6. A hydraulic actuated frictional brake system comprising: a frictional brake mechanism; a hydraulic operating system composed of a brake actuating cylinder and means for forcing a braking fluid under pressure into said cylinder to actuate said brake mechanism; and a fluid-cooling pipe coil exposed to atmosphere with its ends connected with said cylinder for circulating fluid to and from said cylinder through said coil.

7. A hydraulic actuated frictional brake system for a motor vehicle comprising: a frictional brake mechanism and an operating cylinder associated with a vehicle wheel, said cylinder having a brake actuating piston connected to said mechanism and an operating chamber; means for forcing a braking liquid under pressure into the operating chamber of said cylinder to operate said piston and thereby actuate said mechanism; a liquid-cooling pipe coil extending beyond said wheel into a position wherein it is subjected to atmospheric air currents; and means connecting the ends of said coil to the operating chamber of said cylinder whereby liquid may circulate to and from said cylinder through said coil independently of said forcing means.

8. A hydraulic actuated frictional brake system comprising: a frictional brake mechanism; a brake actuating cylinder; means for forcing a braking liquid under pressure into said cylinder to actuate said mechanism; a heat radiator exposed to atmosphere; and pipe connections between said cylinder and said radiator permitting endless circulation of liquid into said cylinder and radiator independently of said forcing means.

GEORGE E. PIERCE.